United States Patent [19]

Fukui

[11] Patent Number: 5,186,144
[45] Date of Patent: Feb. 16, 1993

[54] IGNITION CONTROL SYSTEM WITH CYLINDER IDENTIFICATION EVALUATION

[75] Inventor: Wataru Fukui, Himeji, Japan

[73] Assignee: Mitsubishi Denki Kabushiki Kaisha, Tokyo, Japan

[21] Appl. No.: 751,010

[22] Filed: Aug. 28, 1991

[30] Foreign Application Priority Data

Aug. 31, 1990 [JP] Japan .................................. 2-228024

[51] Int. Cl.$^5$ ............................................ F02P 7/077
[52] U.S. Cl. .................................... 123/414; 123/612; 123/643
[58] Field of Search ............... 123/643, 414, 612, 613, 123/617, 609

[56] References Cited

U.S. PATENT DOCUMENTS

| | | | |
|---|---|---|---|
| 4,690,123 | 9/1987 | Kimura et al. ....................... | 123/612 |
| 4,711,227 | 12/1987 | Li et al. ............................... | 123/643 |
| 4,726,347 | 2/1988 | Sasaki et al. ......................... | 123/643 |
| 4,979,487 | 12/1990 | Fukui .................................. | 123/643 |

FOREIGN PATENT DOCUMENTS

| | | |
|---|---|---|
| 3419727 | 11/1985 | Fed. Rep. of Germany . |
| 3743613 | 6/1988 | Fed. Rep. of Germany . |
| 3916024 | 11/1989 | Fed. Rep. of Germany . |

*Primary Examiner*—Andrew M. Dolinar
*Attorney, Agent, or Firm*—Sughrue, Mion, Zinn, Macpeak and Seas

[57] ABSTRACT

Continued improper and erroneous ignition control resulting from misidentification of reference positions of the cylinders of an internal combustion engine can be prevented in an effective manner. A signal generator generates a reference signal SGT representative of at least one predetermined reference crank angle of each cylinder and a cylinder identification signal SGC. The at least one reference crank angle of each cylinder is successively identified on the basis of the reference signal and the cylinder identification signal. It is evaluated whether the identification of the cylinder reference position is correct. Then, ignition control is performed based on the result of the evaluation. More specifically, ignition control is performed in a timer controlled manner if the cyinder identification is correct. If the cylinder identification is incorrect, it is determined whether an ignition control timing such as the timing for starting the power supply to an ignition coil is earlier than a first reference position. If so, the power supply to the ignition coil is started at the first reference position without using timer control. Contrarily, if not, the power supply is started at a time point after a predetermined time from the first reference position in a timer controlled manner.

7 Claims, 5 Drawing Sheets

IGNITION CONTROL SYSTEM WITH CYLINDER IDENTIFICATION EVALUATION

BACKGROUND OF THE INVENTION

The present invention relates to an ignition control method for an internal combustion engine such as an automotive engine, and more particularly, it relates to an ignition control method capable of preventing erroneous ignition control for improved safety.

In order for a multi-cylinder internal combustion engine to properly operate, ignition for each cylinder must take place as prescribed piston positions or rotational angles of the crankshaft of the engine, i.e., at the times when each piston of the engine is at a prescribed position with respect to top dead center. To this end, it is necessary to sense a predetermined reference crank angle or position for each cylinder and identify which cylinder is at the reference crank angle or position.

FIG. 3 illustrates, in a schematic block diagram, a known ignition control apparatus for an internal combustion engine. The apparatus illustrated includes the following elements which will be described below. A signal generator SG generates, in synchronism with the rotation of the engine, a reference signal SGT indicating predetermined crank angles or positions for each cylinder and a cylinder identification signal SGC containing square pulses for identifying the respective cylinders. The reference signal SGT contains a series of plural square pulses each of which has a leading or rising edge representative of a first reference crank position of a corresponding cylinder, and a trailing or falling edge representative of a second reference crank position thereof. An engine operation sensor (not shown) senses the operating condition of an engine such as the engine load, the speed of a vehicle on which the engine is installed, etc., and generates a corresponding engine operating condition signal D. A period measuring means 1 detects the first and second reference positions for each cylinder based on the reference signal SGT. A target ignition timing calculator 2 calculates, based on the engine operating condition signal D, a target ignition timing θ for each cylinder, at which ignition is to take place, as well as a power supply starting timing for each cylinder, at which the power supply to an ignition coil for a cylinder is started. A time calculating means 3 calculates, based on the target ignition timings, an angular distance in time from the first and second reference positions to the target ignition timings and the power supply starting timings for respective cylinders. A timer means 4 sets an ignition control time T for each cylinder based on the reference signal SGT and the angular distance in time calculated by the time calculating means 3. A cylinder identifying means 5 identifies, based on the reference signal SGT and the cylinder identification signal SGC, which cylinder is at the first or second reference position as detected. Based on the output signal of the timer means 4 and the output signal from the cylinder identification means 5, an electronic distributing means 6 controls the ignition timing of the individual identified cylinders in accordance with the ignition control time T. A plurality of power transistors 7 for controlling the conduction of corresponding ignition coils 8, each of which is provided for a corresponding cylinder, are turned on and off by the distributing means 6 in a prescribed sequence.

Though not illustrated in detail, the above-mentioned elements 1 through 6 are incorporated in an electronic control unit ECU (not shown) such as a microcomputer. In addition, each of the ignition coils 8 has a primary winding connected to a corresponding power transistor 7 and a secondary winding connected to a corresponding spark plug (not shown) having a spark gap.

FIG. 4 is a timing chart showing the relationship between the reference signal SGT and the cylinder identification signal SGC, in which B75° indicates the first reference position, i.e., the rising edge of a pulse of the reference signal SGT which takes place at a crank angle of 75° before top dead center (BTDC), and B5° indicates the second reference position, i.e., the falling edge of a pulse of the reference signal SGT which takes place at a crank angle of 5° BTDC.

Here, the reference signal SGT and the cylinder identification signal SGC as illustrated are for a four-cylinder internal combustion engine. Based on the voltage level of the cylinder identification signal SGC at the second reference position B5° of a pulse of the reference signal SGT and at the first reference position B75° of the following SGT pulse, the cylinder identifying means 5 sequentially identifies the cylinders #1, #3, #4 and #2 in this order, so the operations of the cylinders are controlled in the same order.

FIG. 5 is a timing chart showing the relationship between the reference signal SGT and the current flowing in the ignition coils in which Tr represents the period between successive ignition control points; Ts a time duration from the first reference position of B75° to the power supply cut-off point (i.e., ignition point); Ton1 a time duration from the first reference position B75° to the current power supply starting point for a second ignition coil 8 at which current $I_2$ starts to be supplied to the second ignition coil 8 for cylinder #2; Ton2 a time duration from the preceding second reference position B5° to the power supply starting point for the second ignition coil 8; and Ton3 a time duration from the preceding ignition or power supply cut-off point for a first ignition coil 8 for cylinder #1, to a current power supply starting point at which current $I_2$ starts to be supplied to the second ignition coil 8. In this regard, it is to be noted that the ignition time Ts as well as the respective time durations Ton1, Ton2 and Ton3 are included in the ignition control time signal T supplied from the timer means 4 to the distributor 6.

The operation of the above-mentioned known ignition control apparatus will now be described in some detail with reference to FIGS. 3 through 5.

The signal generator SG generates, in synchronism with the rotation of the engine, a reference signal SGT containing a series of square pulses each of which rises at the first reference position B75° (i.e., at 75° BTDC) and falls at the second reference position B5° (i.e., at 5° BTDC), and a cylinder identification signal SGC. The reference signal SGT thus generated is input to the period measuring means 1 and the cylinder identifying means 5, whereas the cylinder identifying signal SGC is input to the cylinder identifying means 5.

The cylinder identifying means 5 identifies the respective cylinders based on the level of the cylinder identification signal SGC at the respective first and second reference position of each pulse contained in the reference signal SGT. For example, as shown in FIG. 4, on the basis of the level of the cylinder identification signal SGC at the second reference position B5° of a preceding SGT pulse and at the first reference position B75° of the current SGT pulse, the cylinder identifying means 5 identifies the cylinder corresponding to the current SGT pulse as follows. If the SGC signal levels at these successive two points are low and high (i.e., 0, 1), respectively, it is then determined that the current SGT pulse corresponds to a first cylinder #1; if they are high and low (i.e., 1, 0), the current SGT pulse corresponds to a third cylinder #3; if they are high and high (i.e., 1, 1), it corresponds to a fourth cylinder #4; and if they are low and low (i.e., 0, 0), it corresponds to a second cylinder #2.

On the other hand, the engine operation signal D from the unillustrated engine operation sensor is input to the target ignition timing calculating means 2 which calculates, based thereon, a target ignition timing $\theta$, which corresponds to a crank angle at which ignition is to take place, in accordance with the operating condition of the engine as sensed.

The time calculating means 3 calculates, based on the target ignition timing $\theta$ and the period signal from the period measuring means 1, an angular distance in time from the current first reference position to the target ignition timing $\theta$, and outputs it to the timer means 4 which generates, based on the angular distance and the reference signal SGT, an ignition control signal T to the distributing means 6.

Based on the ignition control signal T, the distributing means 6 triggers the power transistor 7 for the cylinder to be controlled to turn it on at a point in time at which a predetermined time Ton has elapsed from the predetermined reference position, thus starting the power supply to a corresponding ignition coil 8, and then turns it off at a time point at which a predetermined time Ts has elapsed from the reference position, thus cutting off the power supply to the ignition coil.

The cut-off of the power supply is sequentially effected in the order of cylinder #1, #3, #4 and #2. In addition, the target ignition point T varies depending on the engine operating condition. For example, in cases where current $I_2$ supplied to the second ignition coil 8 for the second cylinder #2 is controlled, as shown in FIG. 5, the power supply starting point and the power supply cut-off point are both controlled in an ignition-retarding direction under a light or low engine load, so a time duration Ton1 counting from the first reference position B75° is selected. On the other hand, under a heavy or high engine load, both the power supply starting point and the power supply cut-off point are controlled in an ignition-advancing direction, so a time duration Ton2 from the second reference position B5° of a preceding SGT pulse for the preceding cylinder or a time duration Ton3 from the falling edge of the preceding ignition coil current $I_1$ (i.e., the cut-off time of the power supply to the ignition coil for the preceding cylinder) is selected to enable the power supply to be controlled at a point in advance of the first reference position B75° of the current cylinder being controlled.

In this manner, taking the first and second reference positions B75°, B5° or the ignition point of a previously controlled cylinder as a reference point, a target ignition control point T including the power supply starting point Ton and the power supply cut-off point Ts is controlled so that the cylinders are ignited in a usual timer-controlled manner.

In this connection, the cylinder identification means 5 generally includes memory means for automatically coinciding, after first cylinder identification, successive reference signal pulses with the remaining cylinders.

In this case, however, once a reference signal pulse for a certain cylinder is misidentified, a series of reference signal pulses thereafter successively input to the cylinder identifying means 5 are all misidentified, so ignition control is effected based on the erroneous cylinder identification.

SUMMARY OF THE INVENTION

Accordingly, the present invention is aimed at overcoming the above-mentioned problem of the known ignition control apparatus and method as described.

An object of the present invention is to provide a novel and improved ignition control apparatus and method for an internal combustion engine which can prevent continued improper and erroneous ignition control resulting from misidentification of the cylinders in an effective manner.

To achieve the above object, according to one aspect of the present invention, there is provided an ignition control apparatus for an internal combustion engine having a plurality of ignition coils connected to spark plugs for igniting corresponding cylinders. The apparatus comprises: a signal generator for generating a reference signal representative of at least one reference crank angle for each cylinder of the engine and a cylinder identification signal; and ignition control means for performing ignition control on the cylinders on the basis of the output signals form the signal generator, the ignition control means identifying the operation of each cylinder based on the output signals of the signal generator, evaluating whether the cylinder identification is correct, and controlling the power supply to the ignition coils based on the result of the evaluation.

The ignition control means controls a power supply starting point such that if it is determined that the cylinder identification is correct, it starts the power supply to the ignition coil for a cylinder to be controlled at a time point after a predetermined time from a first reference position in a timer controlled manner, and that if it is determined that the cylinder identification is incorrect, it starts the power supply either at a second reference position without using timer control if a point in time of starting the power supply is earlier than the second reference position, or at a time point after a prescribed time from the second reference position in a timer controlled manner if the power supply starting point is later than the second reference position.

Preferably, the ignition control means comprises: ignition timing calculating means for calculating appropriate ignition control timings for each cylinder of the engine based on the output signals from the signal generator and the operating condition of the engine, and generating a corresponding output signal; timer means for setting a length of time for starting and/or cutting off the power supply to the ignition coils based on the reference signal from the signal generator and the output signal from the ignition timing calculating means; cylinder identification means for identifying at least one reference position of the cylinders based on the reference signal and the cylinder identification signal from the signal generator and generating a corresponding cylinder identification signal; cylinder identification evaluating means for evaluating, based on the cylinder identification signal from the cylinder identification means, whether the identification of the cylinders is correct; and a controller for controlling the power supply starting and cut-off time for the ignition coils based on the outputs of the timer means, the cylinder identification evaluating means and the signal generator in the above-mentioned manner.

According to another aspect of the invention, there is provided an ignition control method for an internal combustion engine using a signal generator which generates a reference signal representative of at least one reference position of each of the engine cylinders and a cylinder identification signal. The method comprises the steps of: successively identifying, on the basis of the reference signal and the cylinder identification signal from the signal generator, which cylinder is at the reference position; evaluating whether the identification of the cylinders is correct; and performing ignition control based on the result of the evaluation.

The step of performing ignition control based on the result of the evaluation comprises the steps of: performing ignition control in a timer controlled manner if the cylinder identification is correct; determining whether an ignition control timing is earlier than a first reference position, if the cylinder identification is incorrect; starting, if the ignition control timing is earlier than the first reference position, ignition control at the first reference position without using timer control; and starting, if the ignition control timing is later than the first reference position, ignition control at a time point after a predetermined time from the first reference position in a timer controlled manner.

Preferably, the step of evaluating whether the cylinder identification is correct comprises the steps of: comparing a current cylinder identification with a previous cylinder identification; determining that the current cylinder identification is correct, if there is agreement between the current and previous cylinder identifications; determining that the current cylinder identification is incorrect, if there is disagreement between the current and previous cylinder identifications; and repeating the above comparison step until there is agreement between at least two successive cylinder identifications.

Preferably, the ignition control is to control the point in time of starting the power supply to the ignition coils, and the ignition control timing is the power supply starting time point.

The above and other objects, features and advantages of the invention will become more readily apparent from the following detailed description of a preferred embodiment thereof taken in conjunction with the accompanying drawings.

DESCRIPTION OF THE PREFERRED EMBODIMENT

A preferred embodiment of the present invention will now be described in detail while referring to the accompanying drawings.

Figure 1:
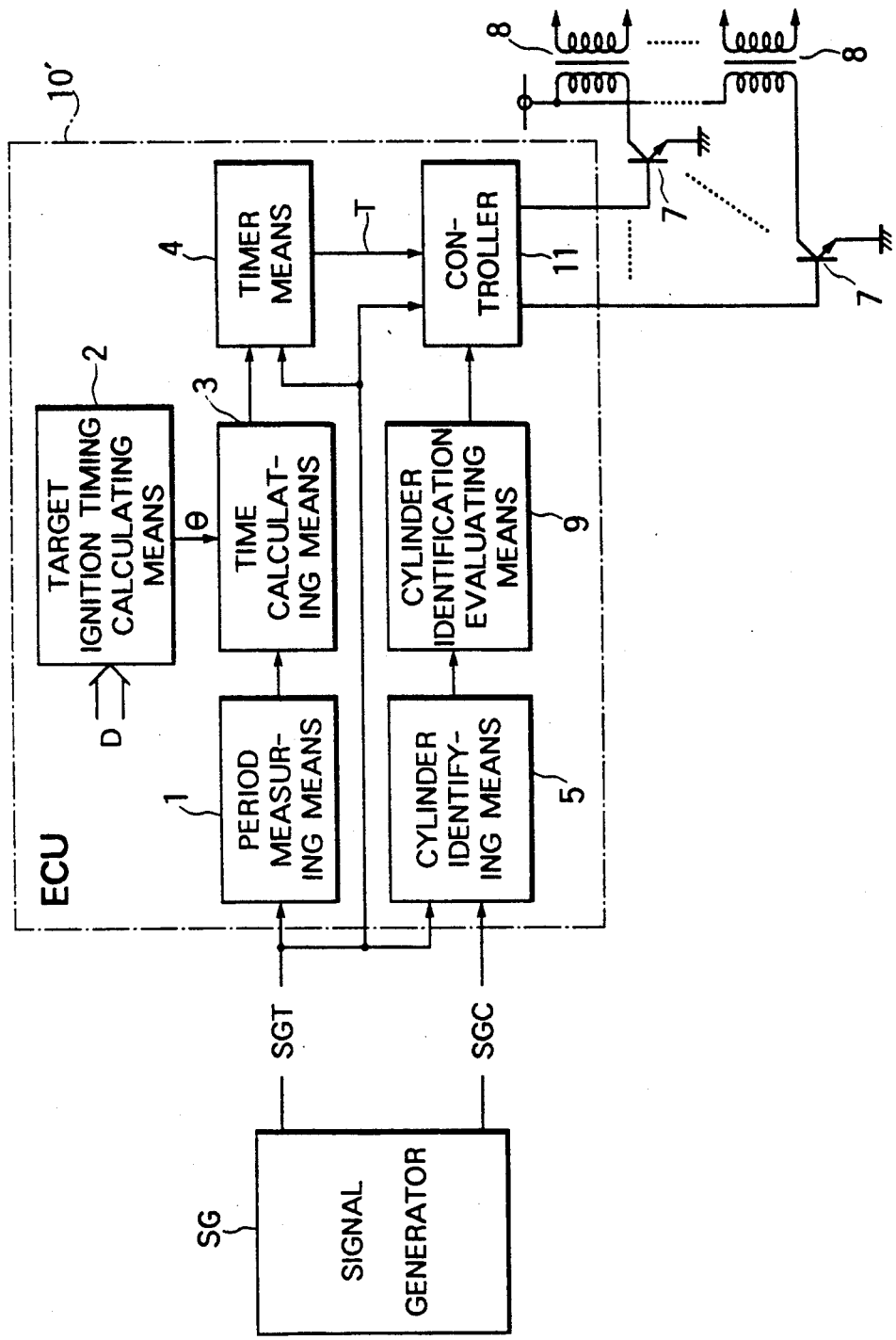
FIG. 1 is a schematic block diagram showing the general arrangement of an ignition control apparatus for an internal combustion engine in accordance with the present invention.
Figure 3:
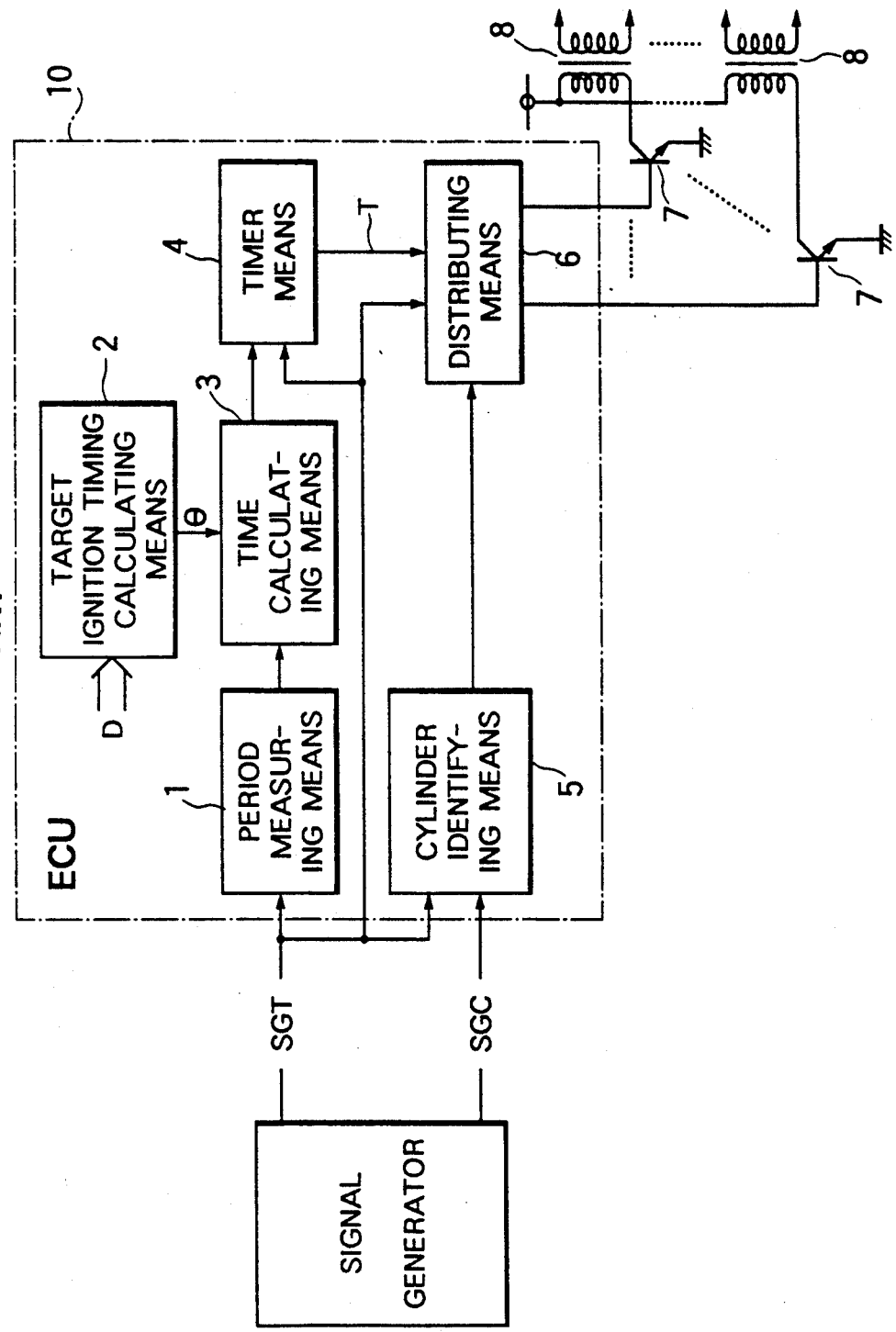
FIG. 3 is a schematic block diagram showing the general arrangement of a known ignition control apparatus for an internal combustion engine.
Figure 4:
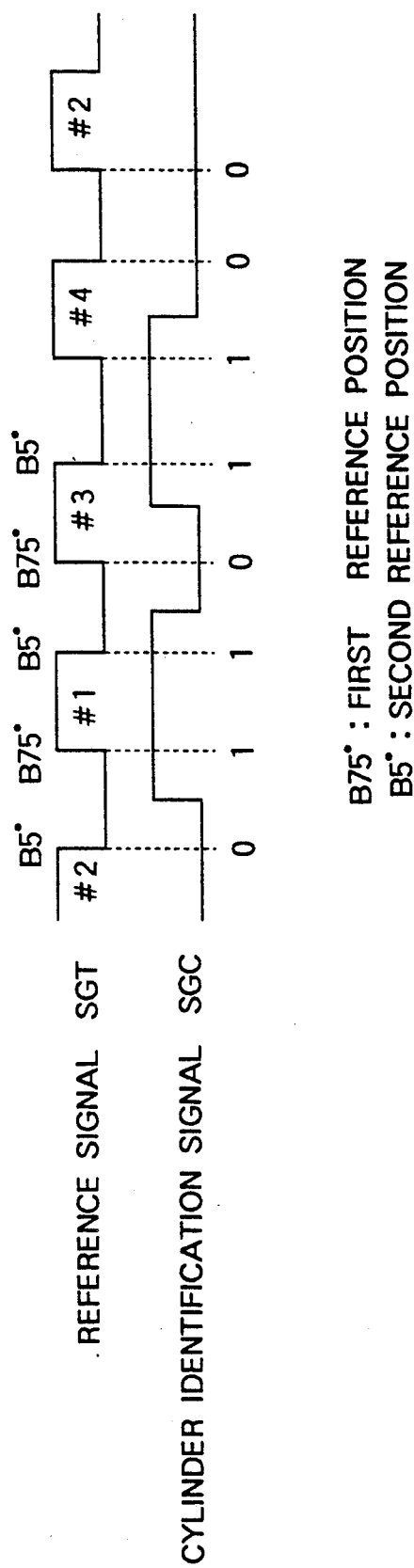
FIG. 4 is a timing chart showing a reference signal SGT and a cylinder identification signal SGC generated by a signal generator of FIG. 1 or FIG. 3.

Referring first to FIG. 1, there is diagrammatically shown the general arrangement of an ignition control apparatus constructed in accordance with the invention. The apparatus of the invention illustrated includes a signal generator SG which is the same as that of FIG. 3, and an electronic engine control unit (ECU) 10' in the form of a microcomputer for controlling, through respective power transistors 7, the power supply to a plurality of ignition coils 8 each of which is provided for a corresponding cylinder or a set of cylinders of an internal combustion engine. The ECU 10' includes a period measuring means 1, a target ignition timing calculating means 2, a time calculating means 3, a timer means 4 and a cylinder identification means 5, all of which are similar in operation to the corresponding elements 1 through 5 of the known ignition control apparatus of FIG. 3. The ECU 10' of the invention further includes a cylinder identification evaluating means 9 for evaluating whether or not the identification of the cylinders is correct, and a controller 11 for controlling, based on the output signals from the signal generator SGC, the timer means 4 and the cylinder identification evaluating means 9, the operations (on and off) of the power transistors 7 to thereby control the conduction of each ignition coil 8. More specifically, the signal generator SGC generates a reference signal SGT having a series of square pulses each associated with a corresponding one of a plurality of (four in the illustrated embodiment) cylinders, as well as a cylinder identification signal SGC in synchronism with the rotation of an internal combustion engine, as shown in FIG. 4. At the first reference position or crank angle (e.g., the rising edge of B75°) of a SGT pulse, the cylinder identifying means 5 identifies the cylinder corresponding to a current SGC pulse based on a combination of the voltage levels of the SGC signal respectively at the second reference position or crank angle (i.e., the falling edge of B5°) of the last or preceding SGT pulse and at the first reference crank angle (i.e., B75°) of the current SGT pulse, as previously described with reference to the ignition control apparatus of FIG. 3. Once the cylinder corresponding to the current SGC pulse has been identified in this manner, cylinders corresponding to following SGT pulses successively occurring thereafter can be automatically identified on the basis of the predetermined order of operations of the cylinders, and the results thus obtained are stored in an unillustrated memory, as in the aforementioned known ignition apparatus of FIG. 3. Subsequently, at the first reference crank angle of the following SGT pulse, the cylinder identifying means 5 again performs cylinder identification in the same manner. Then, the evaluation means 9 evaluates the cylinder identification at this time as follows. Namely, this or current cylinder identification is compared with the last or preceding cylinder identification which was performed at the first reference crank angle of the last or preceding SGT. If the current cylinder identification agrees with the preceding cylinder identification, it is determined that the current and previous cylinder identifications are correct and accurate, so cylinder identification has finished. On the other hand, if there is disagreement between them, then it is determined that either or both of the cylinder identifications are incorrect and inaccurate, and cylinder identification is continued until there is agreement therebetween. Thus, the evaluation means 9 performs an evaluation of cylinder identification and generates a corresponding output signal to the controller 11.

In this connection, cylinder identification and hence evaluation thereof can instead be continued until agreement is consecutively obtained a predetermined number of (e.g., several) times.

Here, it is to be noted that the period measuring means 1, the target ignition timing calculating means 2 and the time calculating means 3 together constitute an ignition control means as claimed of the invention.

Figure 2:
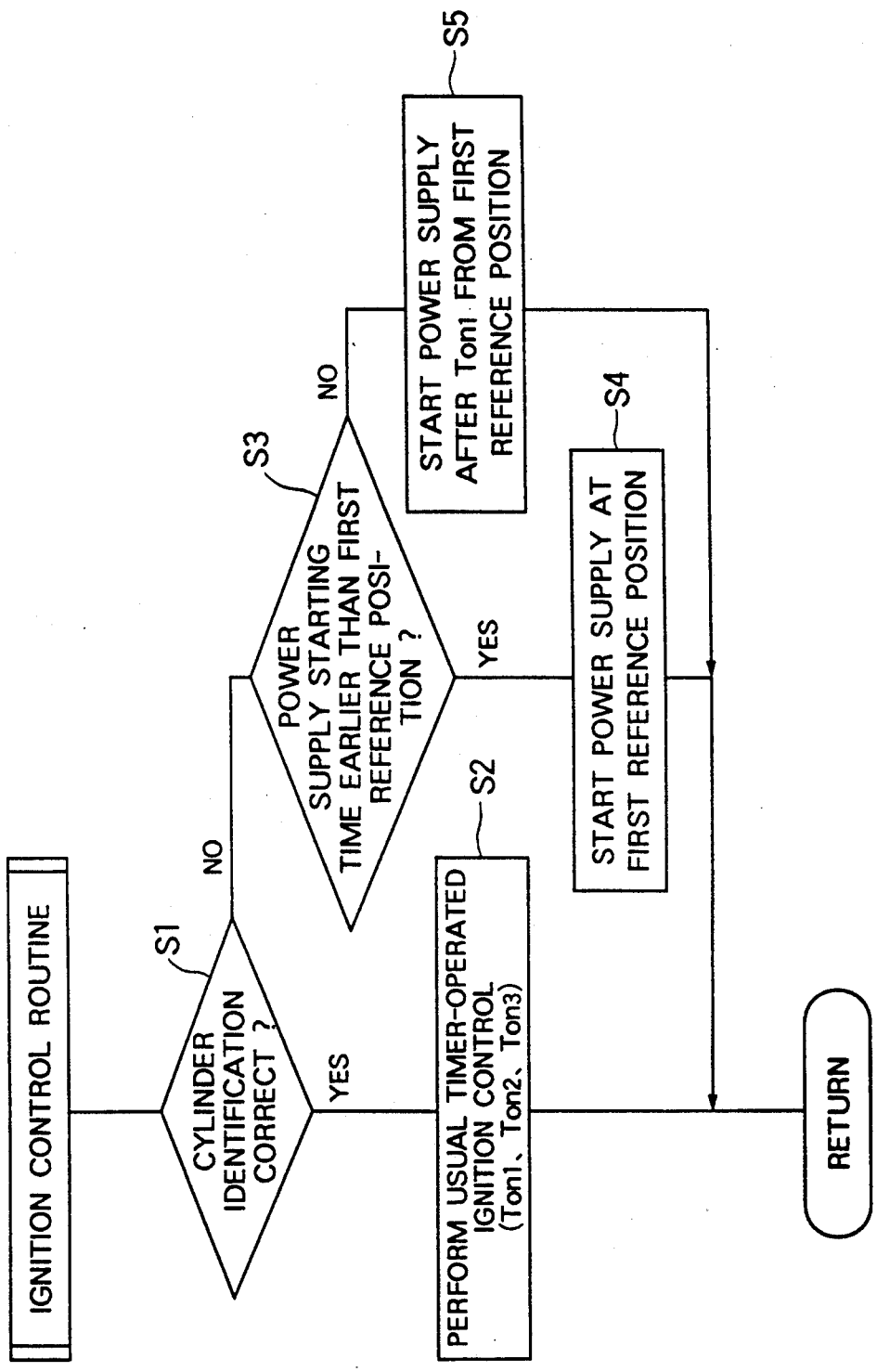
FIG. 2 is a flow chart showing an ignition control method for an internal combustion engine according to the present invention, as carried out by the apparatus of FIG. 1.

FIG. 2 shows a timing control routine of an ignition control method carried out by the apparatus of FIG. 1 in accordance with the present invention.

The operation of the above-mentioned ignition control apparatus or the ignition control method of the invention as carried out thereby will now be described in detail while referring to the flow chart of FIG. 2.

Figure 5:
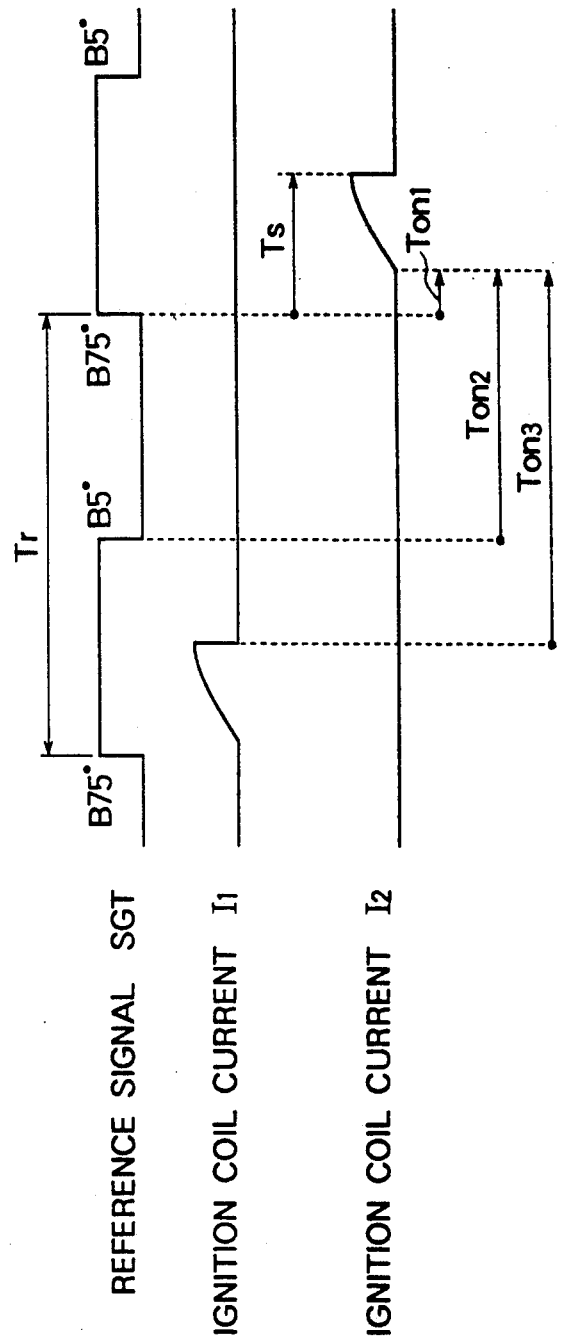
FIG. 5 is a timing chart showing the relationship between the reference signal and ignition coil currents flowing in the ignition coils of FIG. 1 or FIG. 3.

In FIG. 2, first in Step S1, after the cylinder identification means 5 has performed cylinder identification based on the reference signal SGT and the cylinder identification signal SGC from the signal generator SG as referred to above, the evaluation means 9 evaluate the cylinder identification or it determines whether the cylinder identification is correct and accurate, as described above. If the answer is "YES", then in Step S2, the controller 11 performs the usual or normal ignition control under the action of the timer means 4. That is, the power supply to an appropriate one of the ignition coils 8 is started under usual timer control at a time point after the lapse of a time Ton1 from the first reference position or crank angle (e.g., B75°) of a current SGT pulse, or after a time Ton2 from the second reference position or crank angle (e.g., B5°) of the preceding SGT pulse, or after a time Ton3 from the falling edge of the preceding or most recent pulse of the ignition coil current $I_1$ or $I_2$ (i.e., the last ignition point), respectively, as in the case of the previously described known ignition control method illustrated in FIG. 5.

On the other hand, if the answer in Step S1 is "NO" (i.e., it is determined that the cylinder identification is incorrect), then in Step S3, the controller 11 determines, based on an ignition control timing T from the timer means 4, whether the time point for starting the power supply to the ignition coil 8 for a cylinder to be controlled is in advance of the first reference crank angle B75° of a current SGT pulse.

If the answer in Step S3 is "YES", then in Step S4, the controller 11 starts the power supply to the ignition coil 8 for a cylinder being controlled at the first reference crank angle B75° of the current SGT pulse. The cylinder being controlled is determined based on the current cylinder identification which is made at the first reference crank angle B75° of the current SGT pulse. Thus, in this case, the power supply starting time Ton2 or Ton3 is not employed, and the power supply to that ignition coil 8 is forcedly started at the first reference crank angle B75°. As a result, to mistakenly start the power supply at a time point earlier than the first reference crank angle B75° due to incorrect or inaccurate cylinder identification can be avoided.

On the contrary, if the answer in Step S3 is "NO" (i.e., the point of starting the power supply is later than the first reference crank angle B75° of the current SGT pulse), then in Step S5, the power supply to that ignition coil 8 is started under usual timer control after the lapse of a time Ton1 from that first reference crank angle B75°. That is, even prior to correct cylinder identification, the power supply control can be effected in a usual timer controlled manner without any difficulty if the power supply starting point is later than the first reference crank angle B75° of the current SGT pulse. In this connection, it is to be noted that the cylinder identification will be effected at the first reference crank angle B75° of the current SGT pulse, i.e., before the time point at which the power supply is actually started.

Although in the above description, the ignition control method of the invention is carried out by the individual elements 1 through 5, 9 and 11 of the ECU 10', it can be performed by software in the form of a control program executed by a CPU of the ECU while providing the same results.

What is claimed is:

1. An ignition control apparatus for an internal combustion engine having a plurality of ignition coils connected to spark plugs for igniting corresponding cylinders, said apparatus comprising:

a signal generator for generating a reference signal representative of at least one reference crank angle for each cylinder of the engine and a cylinder identification signal; and ignition control means for performing ignition control on the cylinders on the basis of the output signals from said signal generator, said ignition control means identifying the operation of each cylinder based on the output signals of said signal generator at every predetermined reference timing, and including means for evaluating whether the cylinder identification is correct, and controlling the power supply to the ignition coils based on the result of the evaluation such that before cylinder identification is evaluated correct, the power supply to the ignition coils is prevented from being started in advance of the predetermined reference timing.

2. An ignition control apparatus according to claim 1, wherein said ignition control means controls a power supply starting point such that if it is determined that the cylinder identification is correct, it starts the power supply to the ignition coil for a cylinder to be controlled at a time point after a predetermined time from a first reference position in a timer controlled manner, and that if it is determined that the cylinder identification is incorrect, it starts the power supply either at a second reference position without using timer control if a point in time of starting the power supply is earlier than said second reference position, or at a time point after a prescribed time from said second reference position in a timer controlled manner if the power supply starting point is later than said second reference position.

3. An ignition control apparatus according to claim 2, wherein said ignition control means comprises:

ignition timing calculating means for calculating appropriate ignition control timings for each cylinder of the engine based on the output signals from said signal generator and the operating condition of the engine, and generating a corresponding output signal;

timer means for setting a length of time for at least one of starting and cutting off the power supply to said ignition coils based on the reference signal from said signal generator and the output signal from said ignition timing calculating means;

cylinder identification means for identifying at least one reference position of the cylinders based on the reference signal and the cylinder identification signal from said signal generator and generating a corresponding cylinder identification signal;

cylinder identification evaluating means for evaluating, based on the cylinder identification signal from said cylinder identification means, whether the identification of the cylinders is correct; and a controller for controlling the power supply starting and cut-off time for the ignition coils based on the outputs of said timer means, said cylinder identification evaluating means and said signal generator in the above-mentioned manner.

4. An ignition control method for an internal combustion engine using a signal generator which generates a reference signal representative of at least one reference position of each of the engine cylinders and a cylinder identification signal, said method comprising the steps of:

successively identifying the operation of each cylinder on the basis of the reference signal and the cylinder identification signal from said signal generator at every predetermined reference timing;

evaluating whether the identification of the cylinders is correct; and performing ignition control based on the result of the evaluation such that before cylinder identification is evaluated correct, the power supply to the ignition coils is prevented from being started in advance of the predetermined reference timing.

5. An ignition control method according to claim 4, wherein the step of performing ignition control based on the result of the evaluation comprises the steps of:

performing ignition control in a timer controlled manner if the cylinder identification is correct;

determining whether an ignition control timing is earlier than a first reference position, if the cylinder identification is incorrect;

starting, if the ignition control timing is earlier than the first reference position, ignition control at the first reference position without using timer control; and starting, if the ignition control timing is later than the first reference position, ignition control at a time point after a predetermined time from the first reference position in a timer controlled manner.

6. An ignition control method according to claim 4, wherein the step of evaluating whether the cylinder identification is correct comprises the steps of:

comparing a current cylinder identification with a previous cylinder identification;

determining that the current cylinder identification is correct, if there is agreement between the current and previous cylinder identifications;

determining that the current cylinder identification is incorrect, if there is disagreement between the current and previous cylinder identifications; and repeating the above comparison step until there is agreement between at least two successive cylinder identifications.

7. An ignition control method according to claim 5, wherein said ignition control is to control the point in time of starting the power supply to the ignition coils, and said ignition control timing is the power supply starting time point.

* * * * *